(No Model.)
J. H. WUNDES.
TOOL HANDLE.
No. 399,641. Patented Mar. 12, 1889.
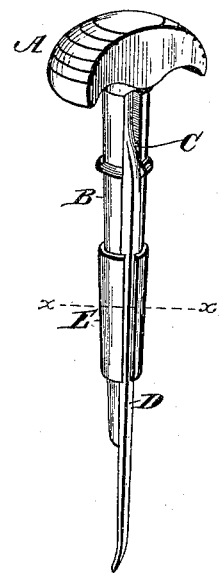
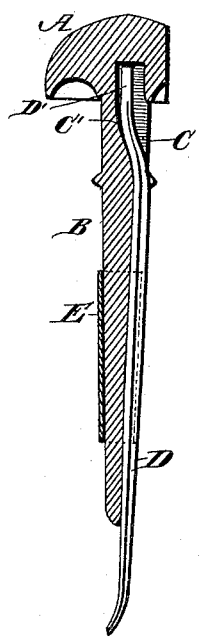
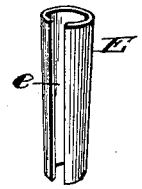
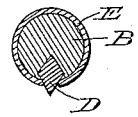
Witnesses.
Inventor:
John H. Wundes
by Wm H Babcock
Atty.

UNITED STATES PATENT OFFICE.

JOHN HENRY WUNDES, OF LANCASTER, PENNSYLVANIA, ASSIGNOR TO E. F. BOWMAN AND W. B. MUSSER, OF SAME PLACE.

TOOL-HANDLE.

SPECIFICATION forming part of Letters Patent No. 399,641, dated March 12, 1889.

Application filed October 22, 1888. Serial No. 288,811. (No model.)

*To all whom it may concern:*

Be it known that I, JOHN HENRY WUNDES, a citizen of the United States, residing at Lancaster, in the county of Lancaster and State of Pennsylvania, have invented certain new and useful Improvements in Tool-Handles; and I do hereby declare the following to be a full, clear, and exact description of the invention, such as will enable others skilled in the art to which it appertains to make and use the same.

This invention has for its object to provide for the convenient attachment and detachment of a tool to and from its handle, to hold the tool firmly to the handle, and to protect the hand of the user when pressing thereon. It is more especially intended for the benefit of engravers. I attain the said object by the combination of a tapering grooved handle with a sliding sleeve of similar shape, the groove having a sudden bend at the rear part of the handle, so as to admit a curved terminal part of the tool to a more central position, preventing any movement when pressure is made on the other end and protecting the hand from injury in pressing on said tool.

In the accompanying drawings, Figure 1 represents a perspective view of a handle and tool embodying my invention. Fig. 2 represents a longitudinal section of the same, and Fig. 3 represents a detail view of the sleeve. Fig. 4 represents a cross-section through the line $x\ x$ of Fig. 1.

A designates the rounded upper or rear part of the handle, and B a tapering stem extending from the center thereof and preferably integral therewith. In this stem is formed a longitudinal groove, C, running from the tip back to and into said rounded part A. The rear end of said groove is bent inward at C' and extended a short distance into the said rounded part A, this bend bringing it into alignment with the center of the latter.

D designates an engraver's tool, the shank of which is adapted to fit the said groove C, and provided with a bent rear end, D', which enters the bent part C' of said groove, but need not conform thereto.

E designates a sleeve tapering in form to correspond to that of the stem B, and slotted on one side at $e$ to allow the lateral protrusion of the side of the shank of said tool. The said shank is prismatic in shape, one corner being presented outward, as shown in Figs. 1 and 2. The edges of sleeve E, forming the sides of slot $e$, overlap the sides of this shank, as plainly shown in Fig. 1, holding the shank within the groove C.

When the tool is to be used, the said shank is fitted into the groove C, and the sleeve E is then slipped on the stem B. The pressure of the point of the tool on the material to be engraved of course tends to force the said shank upward. This shank being in contact with the material of sleeve E at the sides of slot $e$, as aforesaid, the friction between said shank and said sleeve will tend to force the latter upward also; but the downward taper of the sleeve E and of the stem B, which it surrounds, will cause the said sleeve to bind the more tightly the more it is forced upward. Therefore the pressure of the point of the tool on the material to be engraved will fasten the shank of said tool more firmly to the said stem. As the extreme rear parts of the groove and shank are in alignment with the central line of the handle, the downward pressure of the hand is exerted to the best advantage, and as the rear end of said shank enters the rounded part A of the handle, and is surrounded by the material thereof, it is impossible for it to be laterally displaced so long as the sleeve and tool retain the position described. Such displacement would involve serious risk of injury to the engraver's hand, and the protection afforded by the construction aforesaid is therefore particularly important. If the sleeve binds securely the lower end of the tool, and the upper end is embedded in the rounded head, it does not matter whether the intermediate part of the tool fits the groove or not.

Having thus described my invention, what I claim as new, and desire to secure by Letters Patent, is—

1. A tapering tool-handle which is provided with a longitudinal groove in one of its sides, in combination with a tool-shank bent inward at its rear end but extending laterally out from said groove, and a movable sleeve fitting on said handle in contact with said shank to hold the latter in place, substantially as set forth.

2. A tool-handle having a longitudinal groove which ends before reaching the upper end of said handle, in combination with a tool-shank bent inward at its upper end and set into said groove, and a removable sleeve which fits on said handle in contact with said stem to bind the latter in place, substantially as set forth.

3. A tapering longitudinally-slotted sleeve, in combination with a tool-shank and a tool-handle having a tapering stem which is provided with a longitudinal groove to receive said tool-shank, the groove and slot corresponding in position, and the side of the tool-shank extending into said slot, substantially as set forth.

In testimony whereof I affix my signature in presence of two witnesses.

JOHN HENRY WUNDES.

Witnesses:
ALLAN A. HERR,
J. H. GROVE.